United States Patent

Adams

[11] 4,049,856
[45] Sept. 20, 1977

[54] GASKETS

[75] Inventor: David John Adams, Great Haywood, England

[73] Assignee: TBA Industrial Products Limited, England

[21] Appl. No.: 689,251

[22] Filed: May 24, 1976

Related U.S. Application Data

[63] Continuation-in-part of Ser. No. 515,410, Oct. 16, 1976, abandoned.

[51] Int. Cl.² .......................... B32B 1/10; F02F 1/00
[52] U.S. Cl. ........................... 428/131; 277/235 A; 277/235 B; 428/132; 428/136; 428/323; 428/325; 428/440; 428/443; 428/444; 428/462; 428/465
[58] Field of Search ............... 428/323, 440, 443, 444, 428/465 HL, 325, 136, 131, 132; 277/235 A, 235 B

[56] References Cited

U.S. PATENT DOCUMENTS

| 1,893,881 | 1/1933 | Braner | 427/131 |
|---|---|---|---|
| 2,557,778 | 6/1951 | Barry | 428/440 |
| 3,316,139 | 4/1967 | Alford | 428/325 |
| 3,477,867 | 11/1969 | Hillier | 428/131 |
| 3,515,625 | 6/1970 | Sedlak | 428/323 |
| 3,524,794 | 8/1970 | Jonnes | 428/323 |
| 3,567,234 | 3/1971 | Skrycki | 277/235 B |
| 3,769,126 | 10/1973 | Koler | 428/323 |
| 3,897,576 | 7/1975 | Qualtrough | 427/174 |
| 3,922,391 | 11/1975 | Qualtrough | 427/174 |

FOREIGN PATENT DOCUMENTS

| 1,362,174 | 7/1974 | United Kingdom |
| 1,362,657 | 8/1974 | United Kingdom |

OTHER PUBLICATIONS

"Cenospheres in Pulverized-fuel ash," *Journal of the Institute of Fuel,* Sept. 1968, pp. 339–344.

Primary Examiner—Ellis Robinson
Attorney, Agent, or Firm—Diller, Brown, Ramik & Wight

[57] ABSTRACT

This invention relates to a metal-cored asbestos-rubber gasket wherein openings are formed in the gasket with the openings being defined by eyelets. The eyelets have flanges which engage the facing layers of the gasket and normal cracking of the eyelets incipient to incorporation thereof in the gasket is prevented by incorporating in the facing layer material microspheres in a sufficient amount to permit crushing thereof by the eyelet flanges under pressure.

6 Claims, 4 Drawing Figures

GASKETS

This application is a continuation-in-part of my co-pending application Ser. No. 515,410, filed Oct. 16, 1974 now abandoned.

The present invention is concerned with metal-cored asbestos-rubber gasket materials of the kind described in U.S. Pat. Nos. 3,897,576 and 3,922,391. These gasket materials have a high proportion of asbestos in the asbestos-rubber facings which lie on each side of the metal core and this results in the facings being both dense and relatively hard. Despite this, such gasket materials are often required to effect a seal against both gases and liquids under conditions which are not uniform over the face of the gasket. To satisfy such a requirement, the gasket facings must have good conformability at relatively low pressures and yet resist lateral flow, for example into apertures through the gasket. The gasket materials described in the patents just referred to have good conformability, exhibiting compressibilities in the range 10–20%, under normal bolt loadings of 7–10 $MN/m^2$. They also exhibit extremely high values of "compression set", which is a measure of the permanent reduction in thickness achieved by temporarily compressing a sample under a given load, the ratio of the resulting permanent change in thickness to the temporary change in thickness under the given load being expressed as a percentage. Compression set may therefore be calculated by means of the equation: ( $$(t_0 - t_2/t_0 - t_1) \times 100 \%$$

where
$t_O$ = original thickness
$t_1$ = thickness under the given load.
and
$t_2$ = the final thickness, after removal of the given load.

Typically, values of 80–90% are observed, the figure never falling as low as 50%.

In particular the present invention relates to gaskets made from these materials by any process which involves punching apertures and then fitting metal eyelets, sometimes called ferrules, into the apertures. The use of such metal eyelets or ferrules is common practice in order to improve gasket sealing efficiency, particularly around cylinder bore apertures in a cylinder head gasket. In the case of the metalcored materials just referred to, the eyelet when pressed into place is embedded in the gasket facing material, but usually stands proud of the metal core. However, on test it has been observed that such eyeletted gaskets tend to fail prematurely due to splitting of the eyelets. Examination of faulty gaskets shows that the failures are apparently a consequence of the eyelet pressing operation which damages the eyelet itself and/or the metal core in the vicinity of the aperture, at the same time, causing some flow of the gasket facing materials in the same area. Changes in the eyelet pressing techniques used have little or no effect on the problem: neither do changes in the formulation of the facing material aimed at reducing the flow on pressing, since the effect of these latter changes is simply to make the facing material permeable to an extent which is unacceptable.

The present invention provides a metal-cored gasket comprising, in combination, a metal core and a facing layer bonded to each side of said core, each facing layer consisting essentially of asbestos, rubber and microspheres, said rubber and asbestos being present in relative amounts so as to exhibit a compression set greater than 50% in the absence of said microspheres, said microspheres being present in an amount up to 75% by volume and which amount is sufficient locally to modify said facing layer to protect an eyelet from incipient cracks incident to incorporation thereof in the gasket.

It will be appreciated that in the present context the compression set of the gasket facing materials is determined in the absence of the microspheres.

It was found that the incorporation of the microspheres provides the facing material with a "closed-cell" void content which does not significantly affect permeability, although it enables the material to be compressed under the eyelet pressing load without damaging the metal core. Under the normal bolt loadings applied in use however, the microspheres act as an inert filler without collapsing. The microspheres therefore provide for the installation of the eyelets without damaging the metal core and without cracking the eyelets. Otherwise, they have little or no effect on the properties of the gasket material which exhibits increased compression set in the presence of the microspheres because they act essentially as additional filler material, even when collapsed.

Preferably the microspheres are pre-coated with a bonding agent such as a silane before compounding with the rubber and asbestos. Suitable silanes include vinyltriethoxy silance, -aminopropyltriethoxy silane, -methylacryloxy-propytriethoxy silane or -mercaptopropyltriethoxy silane. The use of some such bonding agent is advantageous in improving the resistance of the facing to engine coolants, notably to hot ethylene glycol/water mixtures which cause it to swell and disintegrate, especially if the bonding of the microspheres to the rubber-asbestos matix is poor.

We prefer that in addition to having a compression set appreciably greater than 50% determined in the absence of microspheres and a micropere content of up to 75% by volume, the dry facing material should have a rubber content in the range 15% to 30% by volume and a fibre content of from 10% to 70% by volume. Within these broad limits a wide range of formulations is possible and the following Examples describes a preferred facing material according to the invention.

EXAMPLE

Rubber, accelerators and curing agents were mixed in a Banbury mixer to form a rubber compound which was then steeped for sixteen hours at room temperature in toluene followed by homogenizing in a twin sigma blade mixer to form a dough. This dough was then mixed with asbestos fibre and microspheres in a spike mixer to give a facing dough, an aqueous solution of sodium carbonate being added towards the end of this mixing step so as to give the release characteristics necessary for use in the sheet-forming processes of either of the aforementioned U.S. patents. Finally the dough was extruded and pelletised by means of a conventional mincing machine.

The composition of the dough at the various stages of its manufacture was a follows: all percentages being by volume based on the final facing dough.

1. Rubber Compound

| | |
|---|---|
| Styrene Butadiene Rubber (S.B.R. 1509) | 8.55 |
| Zinc Oxide | 0.08 |
| H.A.F. Carbon Black | 1.89 |

-continued

|  |  |
|---|---|
| Stearic Acid | 0.05 |
| Tetramethylthiuram disulphide | 0.13 |
| N-cyclohexyl benzthiazole-2-sulphenamide | 0.08 |
| Sulphur | 0.02 |
| Total Rubber Compound | 10.80 |

2. Rubber Dough

|  |  |
|---|---|
| Rubber Compound | 10.80 |
| Toluene | 39.42 |
| Total Rubber Dough | 50.22 |

3. Facing Dough

|  |  |
|---|---|
| Rubber Dough | 50.22 |
| Asbestos Fibre (Cassiar AY120) | 15.83 |
| Fuel Ash Cenospheres | 30.18 |
| Sodium Carbonate | 0.24 |
| Water | 3.53 |
| Total Facing Dough | 100.00 |

The facing dough was then applied to both sides of a plain steel core, using the process described in U.S. Pat. No. 3,897,576. After drying and vulcanising the facings, the resulting gasket material was blanked-out, punched and eyeletted in the conventional manner, to produce a cylinder head gasket as shown in plan in the accompanying drawing.

Figure 2:
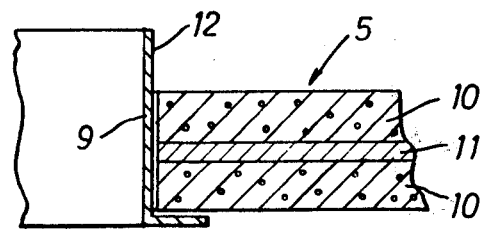
FIG. 2 is a greatly-enlarged cross-sectional side view of one wall of an eyelet A of FIG. 1, but prior to rivetting the eyelet into place.
Figure 3:
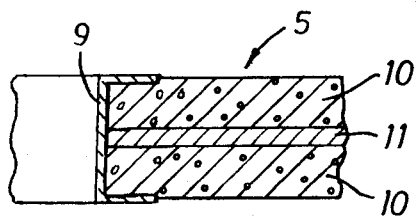

FIG. 3 corresponds to FIG. 2, but after rivetting, and

Figure 4:
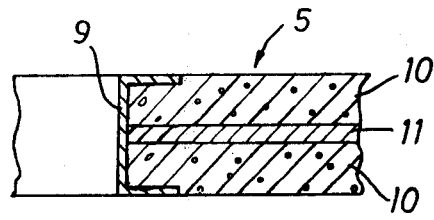

FIG. 4 also shows the eyelet of FIG. 2, but after the gasket has been in service in an engine.

Figure 1:
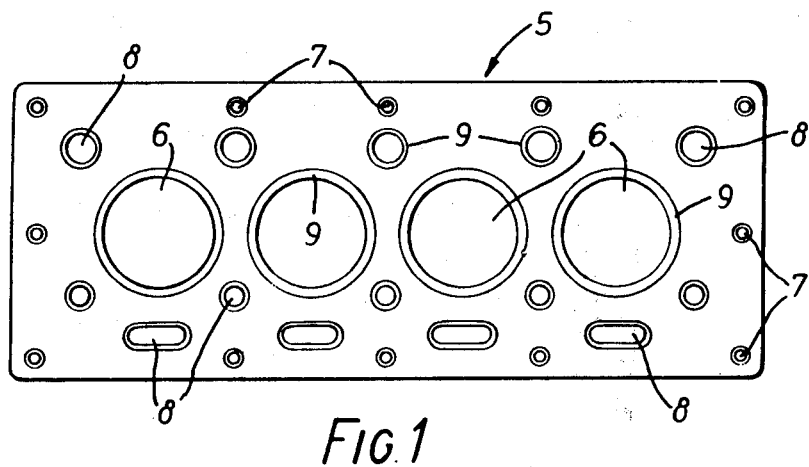
FIG. 1 is a plan view of the gasket.

In FIG. 1, a cylinder head gasket 5 has defined therein a plurality of cylinder bores 6, and a number of bolt holes 7 and a number of water and/or oil passageways 8. Each aperture is provided with a metal eyelet 9, as best seen in FIGS. 2 through 4, wherein the gasket 5 is shown with its facing layers 10 containing the microspheres, and with its metal core 11. In FIG. 2 the eyelet has just been inserted; the gasket material is thus far of sensibly constant thickness, apart from any local deformations at the margins of the apertures caused by the blanking operation. After rivetting over the upstanding portion 12 (FIG. 2) the eyelet lies at least partially embedded in the gasket facing layers 10, as seen in FIG. 3. The microspheres have at least in part collapsed under the eyelet flanges thereby reducing the thickness of the facing layers, without at the same time generating the unacceptably high crack-inducing stresses in the eyelet itself and/or in the metal core, which are encountered with similar facing materials not containing microspheres when subjected to the essentially impact pressures of rivetting, typically of the order of 69MN/m².

In use, the gasket will, at normal bolt loadings of around 10MN/m², tend to flatten slightly into the configuration of FIG. 4, where the working surfaces are essentially flat. This is however, a consequence of the bolt loading being applied only to the eyelets on initial installation in an engine; it is not a consequence of the presence of the microspheres, collapsed or intact. In the immediate vicinity of the apertures, the microspheres therefore provide for a degree of controlled collapse under the pressures applied in the rivetting process, thereby protecting the eylet itself from cracking. The microspheres also act as additional filler material, increasing somewhat the compression set of the facing layers. The facings themselves under normal bolt loadings in an engine were both dense and impermeable, giving a gasket which was satisfactory in service.

What I claim is:

1. A metal-cored gasket comprising, in combination: a metal core; a facing layer bonded to each side of said core, at least one opening through said core and said facing layer, an eyelet in said opening, said eyelet having flanges seated in said facing layers in facing layer deforming relation, each facing layer consisting essentially of asbestos, rubber and microspheres, said rubber and asbestos being present in relative amounts so as to exhibit a compression set greater than 50% in the absence of said microspheres, said microspheres being present in amount up to 75% by volume and which amount is sufficient locally to modify said facing layer to permit crushing thereof by an associated eyelet flange at a pressure to protect said eyelet from incipient cracks incident to incorporation thereof in the gasket.

2. A metal-cored gasket material according to claim 1, wherein the microspheres have a diameter of from about 20 µM to 200 µM and a wall thickness of from 5% to 15% of their diameter.

3. A metal-cored gasket material according to claim 1, wherein the microspheres are fuel ash cenospheres.

4. A metal-cored gasket according to claim 1 wherein the microspheres are coated with a bonding agent before compounding with the rubber and asbestos.

5. A metal-cored gasket material according to claim 4 wherein the bonding agent is a silane.

6. A metal-cored gasket material according to claim 1 wherein the facing layer has a rubber content in the range 15% to 30% by volume and an asbestos fibre content of from 10% to 70% by volume.

* * * * *